United States Patent [19]

Moro et al.

[11] Patent Number: 5,436,729
[45] Date of Patent: Jul. 25, 1995

[54] VIDEO SIGNAL PROCESSING APPARATUS WITH AUTOMATIC PICTURE QUALITY CONTROL FUNCTION AND SIGNAL PROCESSING CIRCUIT

[75] Inventors: Eiji Moro; Yukihiko Ozaki, both of Katsuta, Japan

[73] Assignee: Hitachi, Ltd., Tokyo, Japan

[21] Appl. No.: 982,557

[22] Filed: Nov. 27, 1992

[30] Foreign Application Priority Data

Nov. 27, 1991 [JP] Japan .................. 3-335837

[51] Int. Cl.⁶ .......................... H04N 5/94; H04N 5/783
[52] U.S. Cl. ..................... 358/336; 358/340; 358/312
[58] Field of Search ............... 358/310, 335, 320, 337, 358/340, 139, 312, 336; H04N 5/783; 360/10.1, 38.1, 33.1

[56] References Cited

U.S. PATENT DOCUMENTS

| 5,223,927 | 6/1993 | Kageyama et al. | 358/139 |
| 5,223,947 | 6/1993 | Morikawa | 358/340 |
| 5,249,064 | 9/1993 | Minakawa | 358/327 |

FOREIGN PATENT DOCUMENTS

| 0369756A2 | 5/1990 | European Pat. Off. . |
| 3911162A1 | 10/1989 | Germany . |
| 55-135408 | 10/1980 | Japan | H04N 5/92 |
| 3-104389 | 1/1991 | Japan . |
| 3-58686 | 3/1991 | Japan . |
| 3-58687 | 3/1991 | Japan . |
| 3-76482 | 4/1991 | Japan . |
| 3-85077 | 4/1991 | Japan . |
| 3-182181 | 8/1991 | Japan . |
| 3-198591 | 8/1991 | Japan . |

Primary Examiner—Tommy P. Chin
Assistant Examiner—Huy Nguyen
Attorney, Agent, or Firm—Antonelli, Terry, Stout & Kraus

[57] ABSTRACT

A video signal processing apparatus with an automatic picture quality control function comprises a reproduction unit for reproducing a video signal from a video signal recording medium, an APL detector and a noise detector for detecting as a DC potential signal two different pieces of information affecting the picture quality contained in the video signal reproduced by the reproduction unit, a DC potential shift circuit for shifting the smaller of the two DC potential signals detected by the detectors in accordance with the reproduction mode of the reproduction apparatus, an input terminal for inputting a variable DC potential, a switching unit for selecting the output of the DC potential shift circuit or the input from the input terminal, and a picture quality control circuit for controlling the picture quality of the video signal reproduced at the reproduction apparatus by the DC potential from the switching unit.

7 Claims, 15 Drawing Sheets

VIDEO SIGNAL PROCESSING APPARATUS WITH AUTOMATIC PICTURE QUALITY CONTROL FUNCTION AND SIGNAL PROCESSING CIRCUIT

BACKGROUND OF THE INVENTION

The present invention relates to a video signal processing apparatus having the function of picture quality control for automatically adjusting the picture quality in a proper manner, and a signal processing circuit using the same system.

The home-use VTR is cited as an example of a conventional system relating to the present invention, as disclosed in "Video Technology Handbook" published on Nov. 20 in 1988, pp. 73 to 87, compiled by Editorial Dept. of Audio Video, a monthly Publication. This conventional apparatus will be described below with reference to FIG. 18. For simplification, reference will be made to a VHS system corresponding to the NTSC signal.

FIG. 18 is a block diagram showing an example of a conventional reproduction system for the home-use VTR. Prior to dealing with this diagram, a video signal to be recorded in a magnetic tape 1 will be described. The video signal is separated into a video luminance signal and a color signal, and the video luminance signal is subjected to FM modulation. In the process of FM modulation, the modulated carrier frequency is high when the luminance of a picture as a whole is high (with a bright screen), and low when the luminance is low (with a dark screen). This carrier frequency changes in dependency on the image brightness within a range of 3.4 to 4.4 MHz. On the other hand, the color signal, which is originally an amplitude and phase-modulated signal with a carrier of frequency 3.58 MHz, is changed to a carrier frequency of 629 kHz. The color signal and the luminance signal are thus recorded in separate frequency bands of the magnetic tape 1, the former in a low frequency range and the latter in a high frequency range.

In reproducing the signal thus recorded, in FIG. 18, the FM luminance signal and the low-frequency color signal recorded in the magnetic tape 1 are detected by a magnetic head 2, amplified by a reproduction amplifier 3, and further processed by an FM peaking circuit 4. Peaking processing of the FM peaking circuit 4 recovers the balance between the carrier frequency component and the side band components which are lost due to attenuation of high-frequency components in the magnetic recording and reproducing process of the FM luminance signal. So, the peak frequency of the FM peaking circuit 4 is set in its characteristic which is almost equal to the FM carrier frequency.

At the next step, the signal thus processed is applied to a low-pass filter (hereinafter referred to as "LPF") 5 and a high-pass filter (hereinafter referred to as "HPF") 8. The LPF 5 selectively passes only a low-frequency color signal spreading around 629 kHz. This signal is changed by a frequency converter 6 and a bandpass filter (hereinafter referred to as "BPF") 7 to a high-frequency color signal of around 3.58 MHz, and then applied to a mixer 12. The HPF 8, on the other hand, selectively passes the FM luminance signal with a carrier frequency set between 3.4 MHz and 4.4 MHz, and the resulting signal, after being demodulated by an FM demodulator 9 and the LPF 10 into a video luminance signal, is applied to a picture quality control circuit 11. The picture quality control circuit 11 has the function of reducing the noise and enhancing the contour of a reproduced image by changing the gain-to-frequency characteristic of the signal applied thereto. The output of the picture quality control circuit 11 is applied to the mixer 12, and after being mixed to a high-frequency color signal, is output as a reproduction video signal from a terminal 13. The picture quality control circuit 11 normally changes in characteristic by voltage control. The picture quality control circuit 11 is conventionally used for reducing the noise of a reproduced picture or enhancing the contour information by the user manually controlling a variable resistor or the like as desired.

According to the prior art described above, in view of the fact that the picture quality associated with a reproduced signal is manually controlled by the user, the condition for control is required to be readjusted to an optimum point in accordance with the change in signal-to-noise ratio (hereinafter referred to as "S/N") attributable to the tape deterioration each time the reproduction tape is changed, if a superior picture quality is to be enjoyed. This involves a very complicated picture quality adjusting operation. Also, even during the continuous reproduction of the same tape, the different noticeabilities of noise depending on the brightness of the reproduced screen differentiates the condition for an optimum picture quality for each occasion. It is very difficult to finely adjust the condition for control manually in accordance with such differences.

The same inventors invented a video signal processing apparatus for automatically controlling the picture quality of a reproduced video signal, and filed a U.S. patent application under U.S. Ser. No. 07/826,621 on Jan. 28, 1992. It has been found, however, that an always uniform automatic picture quality control for all reproduction modes including SP mode, EP mode, dubbing mode and still picture mode does not necessarily reproduce a superior picture of a video signal.

SUMMARY OF THE INVENTION

A first object of the present invention is to provide a video signal processing apparatus having the function of automatic picture quality control for performing automatic picture quality control most suitably to a given reproduction mode of a video signal.

Another object of the present invention is to provide a signal processing circuit preferably applied to the apparatus of the first object.

According to the present invention, there is provided a video signal processing apparatus, in which at least a kind of information affecting the picture quality is extracted from an input video signal, a DC potential is generated for controlling the picture quality on the basis of the extracted information, and the DC potential thus generated is made changeable with various reproduction modes including SP, EP, dubbing and still picture, so that the picture quality is controlled in accordance with the DC potential after changing.

DESCRIPTION OF THE PREFERRED EMBODIMENTS

The present invention as applied to a home-use VTR will be explained.

Figure 1A:
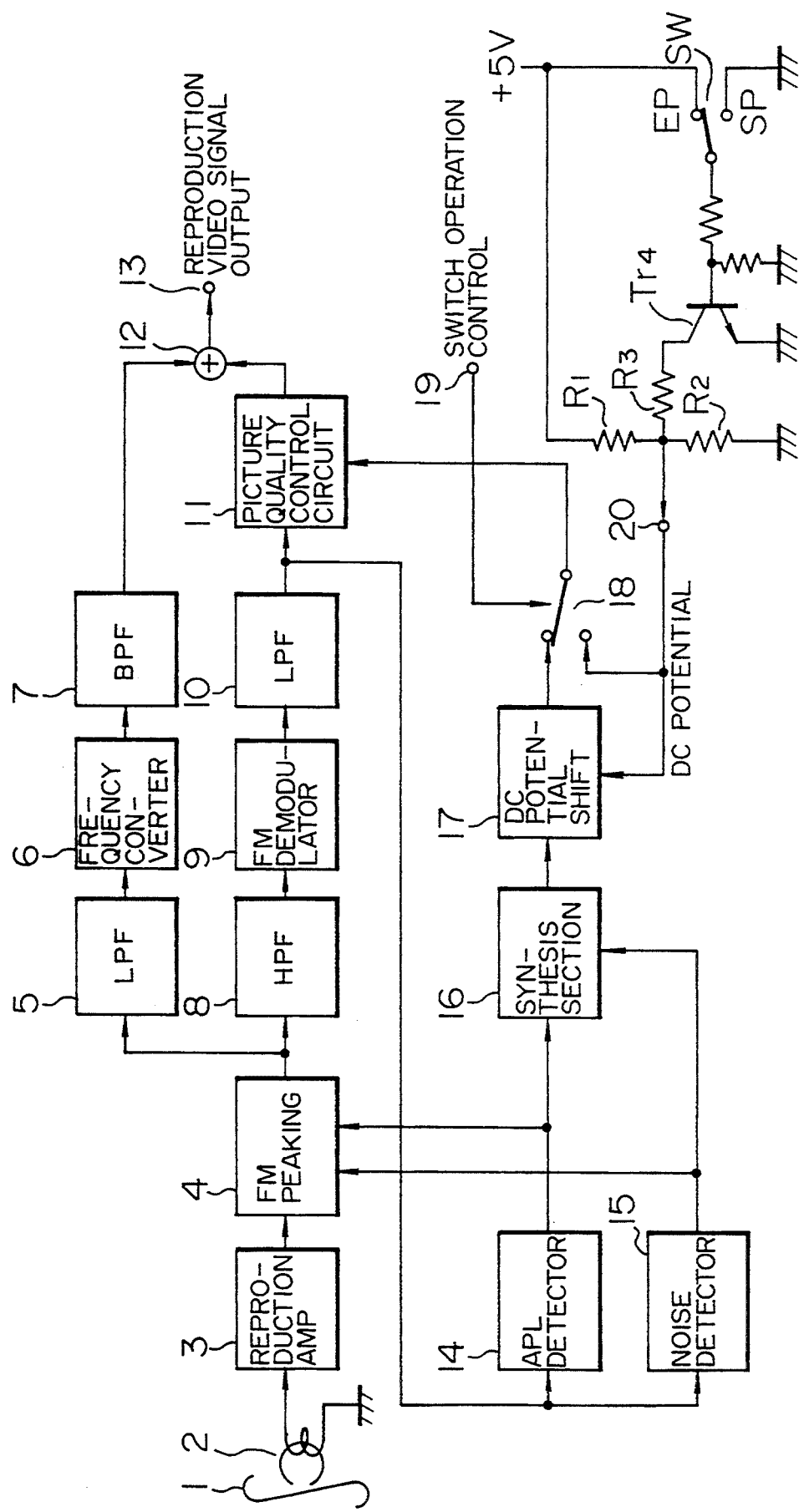
FIG. 1A is a block diagram showing an example of a system according to an embodiment of the present invention as applied to a reproduction system of the home-use VTR.
Figure 18:
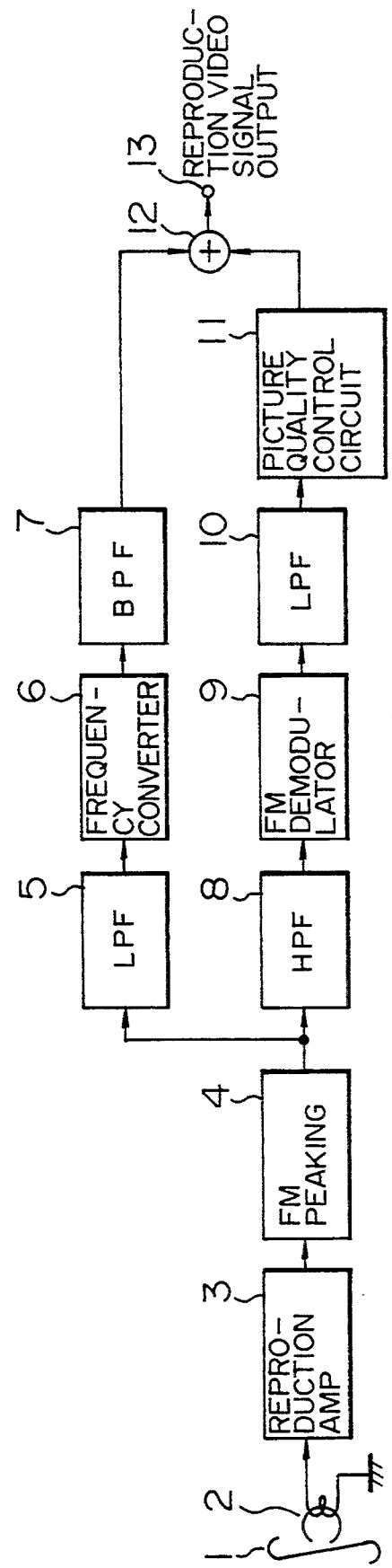
FIG. 18 is a block diagram showing an example of a conventional reproduction system of a home-use VTR.

FIG. 1A is a block diagram showing an example of a system according to the present invention as applied to the reproduction system of a home-use VTR. In FIG. 1A, the functions of the parts including a magnetic tape 1, a magnetic head 2, a reproduction amplifier 3, an FM peaking circuit 4, an LPF 5, a frequency converter 6, a BPF 7, an HPF 8, an FM demodulator 9, an LPF 10, a picture quality control circuit 11, a mixer 12 and a terminal 13 are equal to those described with reference to FIG. 18 above, and therefore will not be explained again.

Figure 2:
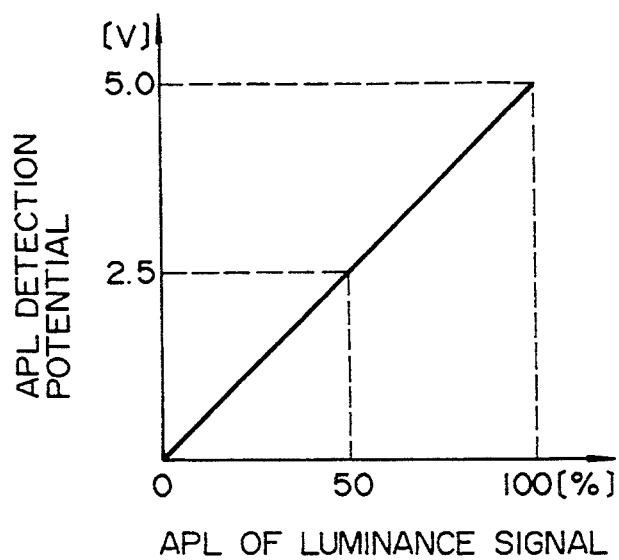
FIG. 2 is a diagram for explaining an example of the characteristics of an APL detector in FIG. 1.
Figure 3:
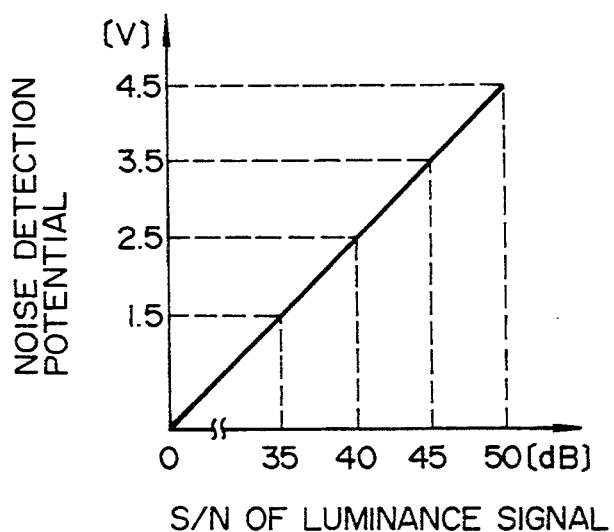
FIG. 3 is a diagram for explaining an example of the characteristics of a noise detector in FIG. 1.

A video luminance signal output from the LPF 10 is applied to an average picture level (hereinafter referred to as "APL") detector 14 and a noise detector 15. The APL detector 14 produces an output signal associated with the average value of the luminance signal, i.e., a signal associated with picture brightness in, which the output signal increases in magnitude with the brightness of the screen. This APL detector 14 has input-output characteristics as shown in FIG. 2. In this diagram, 100% represents a pure white screen and 0% a deep black screen. The noise detector 15, on the other hand, produces a DC potential proportional to S/N of the luminance signal and has input-output characteristics as shown in FIG. 3.

Figure 1B:
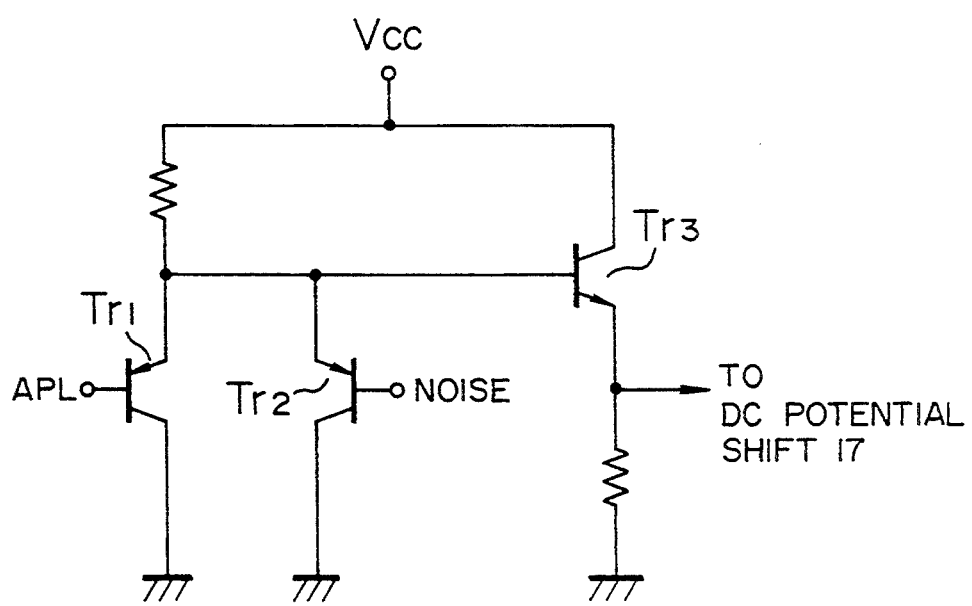
FIG. 1B is a circuit diagram showing an embodiment of a synthesis section in FIG. 1A.

The APL detection potential from the APL detector 14 and the noise detection potential from the noise detector 15 are combined at a synthesis section 16. The synthesis section 16 may have a circuit configuration as shown in FIG. 1B as an example. In FIG. 1B, a transistors Tr1 and Tr2 constitute emitter follower circuits, respectively. The base potential of the transistor Tr1 is transmitted to the emitter thereof as a potential higher than the base potential by a voltage $V_{BE}$ (about 0.7 V) between the emitter and base thereof. The base potential of the transistor Tr3 is transmitted to the emitter thereof as a potential lower than the base potential by the voltage $V_{BE}$ between the emitter and base thereof. Accordingly, a potential substantially equal to the APL detection potential supplied to the base of the transistor Tr1 appears at the emitter of the transistor Tr3. On the other hand, when the base potential of the transistor Tr2 is lower than the base potential of the transistor Tr1, the transistor Tr2 is turned on and the transistor Tr1 is turned off, as a result, the transistor Tr2 is operated as an emitter follower circuit. In that case, a potential substantially equal to the noise detection potential applied to the base of the transistor Tr2 appears at the emitter of the transistor Tr3. The emitter potential of a transistor Tr3, therefore, is dependent on the APL detection potential, and an output thereof is clipped by the noise detection potential and flattened as seen from the characteristics shown in FIG. 4. Specifically, the abscissa and ordinate in FIG. 4 have the same scale as in FIG. 2, and therefore the APL characteristic is also the same. Nevertheless, the signal is clipped at a level equal to the noise detection potential obtained from the S/N characteristic shown in FIG. 3, and the characteristic is flattened for brighter screens. More specifically, the synthesis section 16 produces an APL detection potential or a noise detection potential, whichever is lower.

The DC potential produced from the synthesis section 16 configured this way is applied to a DC potential shift circuit 17 and is subjected to a potential shift as required on the basis of the DC potential from a terminal 20. The output of the DC potential shift circuit 17 and the DC potential from the terminal 20 are switched selectively by a switch in response to a switching control signal from a terminal 19, and a signal thus selected is supplied to a picture quality control circuit 11.

The DC potential shift circuit 17 and the switch 18 perform the most important operations according to the present invention.

Figure 4:
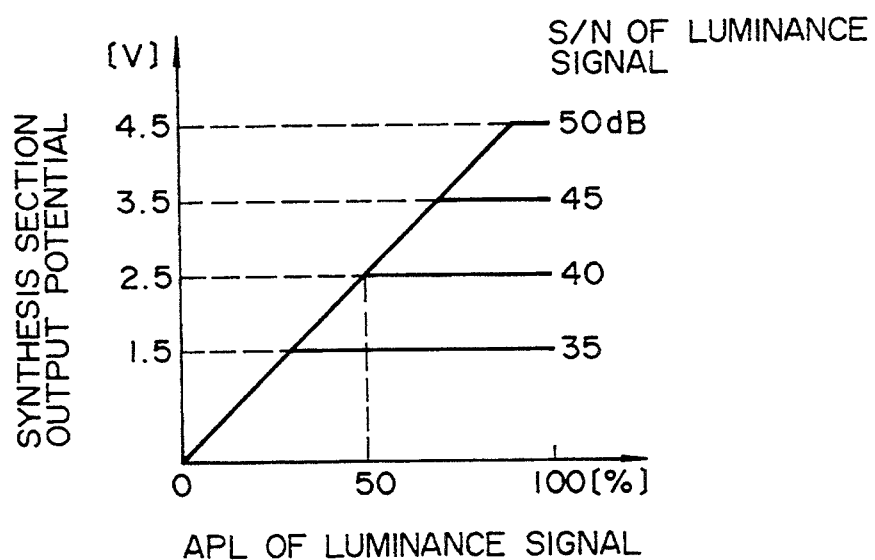
FIG. 4 is a diagram for explaining an example of the characteristics of the synthesis section in FIG. 1.
Figure 5:
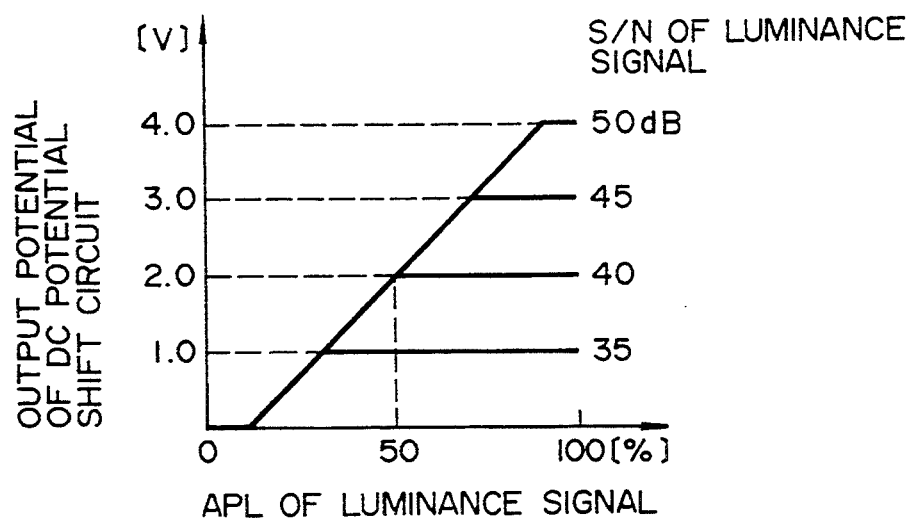
FIG. 5 is a diagram for explaining an example of the characteristics of a DC potential shift circuit in FIG. 1.

The DC shift circuit 17 functions to shift the characteristics shown in FIG. 4 in parallel direction on the basis of the DC potential produced from the terminal 20. The DC potential of 2.5 V at the terminal 20 constitutes a standard condition, when the output characteristics of the DC potential shift circuit 17 coincide with those shown in FIG. 4. Now, assuming that the DC potential at the terminal 20 is 2.0 V, then the output characteristics of the DC potential shift circuit 17 shift toward a low-potential side by 0.5 V on the whole, leading to the characteristics as shown in FIG. 5.

A circuit for switching the DC potential supplied to the terminal 20 between 2.5 V and 2.0 V will be explained. When the switch SW is closed with SP side in FIG. 1A, the transistor Tr4 turns off and the source voltage 5 V is divided by resistors $R_1$ and $R_2$. If the resistance values of $R_1$ and $R_2$ are an equal 2 KΩ, an output of 2.5 V is produced to the terminal 20. When the switch SW is turned to EP side, on the other hand, the transistor Tr4 turns on, with the resistor $R_3$ connected in parallel to the resistor $R_2$. Assuming that the value of the resistor $R_3$ is 4 K$\Omega$, a voltage of 2.0 V appears at the terminal 20. In this way, the DC potential at the terminal 20 is selectable at either 2.5 V or 2.0 V.

Thus, the output of the DC potential shift circuit 17 is selected in the mode of automatic picture quality control, and the DC potential applied from the terminal 20 in modes other than automatic picture quality control, by the control operation of the switch circuit 18. Examples of the latter modes considered effective for this operation include the dubbing mode or special reproduction modes such as still picture or search. At the time of dubbing, it is preferable from the viewpoint of balance between merits and demerits that the automatic picture quality control function not be operated in order to prevent deterioration of waveform response by suspending the operation of a noise reduction circuit, while the noise reduction circuit is operated when a picture is reproduced and displayed from the tape made by dubbing. In a special reproduction mode in which a reproduction magnetic head crosses and traces a plurality of tracks, an erroneous noise detection operation is likely to occur due to the guard band or the effect of interference of adjacent tracks. In this case, too, it is not desirable to operate the automatic picture quality control function.

According to the present invention, therefore, the switch circuit 18 is turned automatically to the terminal 20 in response to the operation of a dubbing select switch or a special reproduction mode select switch, and to the output side of the DC potential shift circuit 17 at the time of normal reproduction. Further, during the normal reproduction operation, the user is able to initiate the automatic picture quality control function (by turning the state of the switch circuit 18) through operating means such as a remote controller button or a select switch on the front panel of the VTR.

Figure 6:
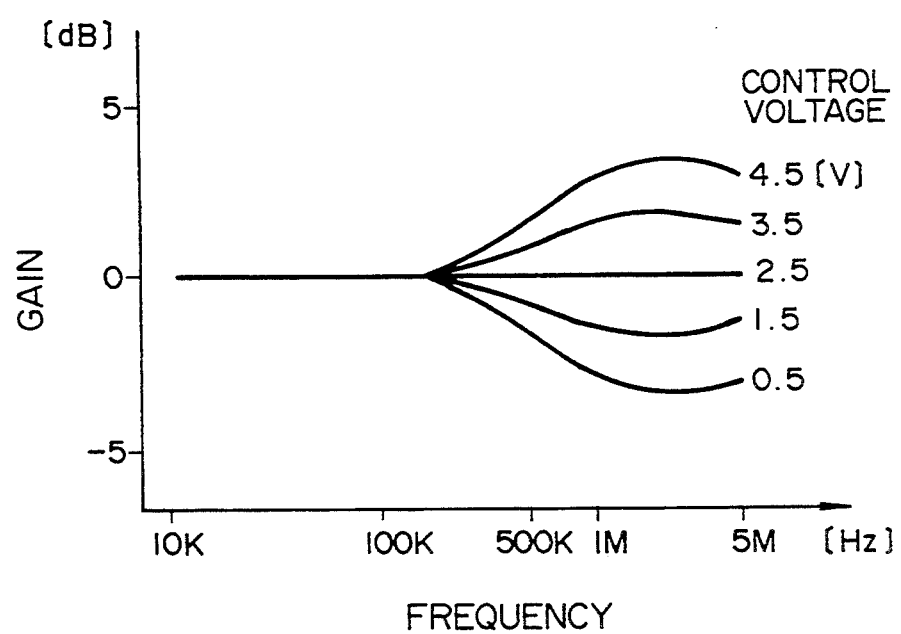
FIG. 6 is a diagram for explaining an example of the characteristics of a picture quality control circuit in FIG. 1.

An example of characteristics of the picture quality control circuit 11 is shown in the characteristics diagram of FIG. 6. A flat gain-to-frequency characteristic is exhibited when the control voltage is 2.5 V, and the picture contour is enhanced due to the increase in high-frequency gain in the range higher than 2.5 V, while the noise reduction effect prevails due to the decrease in high-frequency gain in the range lower than 2.5 V. The picture quality control circuit 11 is thus normally controlled to 2.5 V for a picture determined to contain standard noises.

Assume that the DC potential applied to the terminal 20 is set to 2.5 V and the switch circuit 18 is arranged to pass the output of the DC potential shift circuit 17. The control voltage of the picture quality control circuit 11 coincides with the output potential of the synthesis section shown in FIG. 4. The signal is not clipped by the noise detection potential for a picture having a superior S/N of the luminance signal, and the output potential of the synthesis section increases with the APL of the luminance signal. The control voltage of the picture quality control circuit 11 becomes 2.5 V at an APL of 50% representing the standard characteristic. The enhancement effect of the contour information increases with the increase of APL exceeding 50%, while a higher noise reduction effect is obtained with the decrease in APL below 50%. This characteristic represents a preferable control suitable for a lesser noticeability of noises with the increase in screen brightness. In the case where the luminance signal does not have a superior S/N, the upper limit of the output voltage is capped by the clip operation due to the noise detection potential, so that the noise reduction effect increases and the picture quality control becomes more preferable with the decrease in S/N. The clip potential is 4.5 V for S/N of 50 dB, and 2.5 V for S/N of 40 dB. At the time of dubbing or the like, on the other hand, a fixed voltage of 2.5 V providing a standard setting may be applied by turning the switch circuit 18 to the terminal 20 side.

In the home-use VTR of VHS type, the tape feed rate is classified into the standard mode (hereinafter referred to as "SP mode") and the long-hour mode ("EP mode") with a tape feed rate one third that of the SP mode. In addition to the VHS mode which is an initial video standard, the S-VHS mode is specified with the intention of improving the picture quality by changing FM allocation or otherwise, thus resulting in a multiplication of modes. The optimum characteristics of the picture quality control circuit 11 differ with different modes. In the conventional VRT lacking the automatic picture quality control function, the control potential of the picture quality control circuit 11 is often switched with the mode of operation. The control potential of the picture quality control circuit 11 for the above-mentioned automatic picture quality control function, therefore, is also desirably switched with the mode of operation. According to the present invention, the control potential of the picture quality control circuit 11 (the DC potential applied from the terminal 20 to the DC potential shift circuit 17) is set variably for different reproduction modes in accordance with a change in the video signal recording format on the tape or a change in tape feed rate. In EP mode with an S/N inferior to that of SP mode, for example, the standard control potential is preferably set not to 2.5 V but to a slightly lower 2.0 V. If the DC potential applied from the terminal 20 is set to 2.0 V at the same time, the control potential of the picture quality control circuit 11 for the automatic picture quality control function properly shifts as indicated by the characteristics shown in FIG. 5. Also, at the time of dubbing, etc., the fixed voltage of 2.0 V may be applied from the terminal 20 by turning the switch circuit 18 to the terminal 20 side, As explained above, according to the present invention, the switching operation of the control characteristics with a mode for automatic picture quality control is realized in simplified manner. Further, the setting of a fixed voltage for each mode in non-automatic picture quality control is easily realized.

In addition, the outputs of the APL detector 14 and the noise detector 15 are applied also to the FM peaking circuit 4, and the information involved is used to control the characteristics of the FM peaking circuit 4 as described below.

Figure 7:
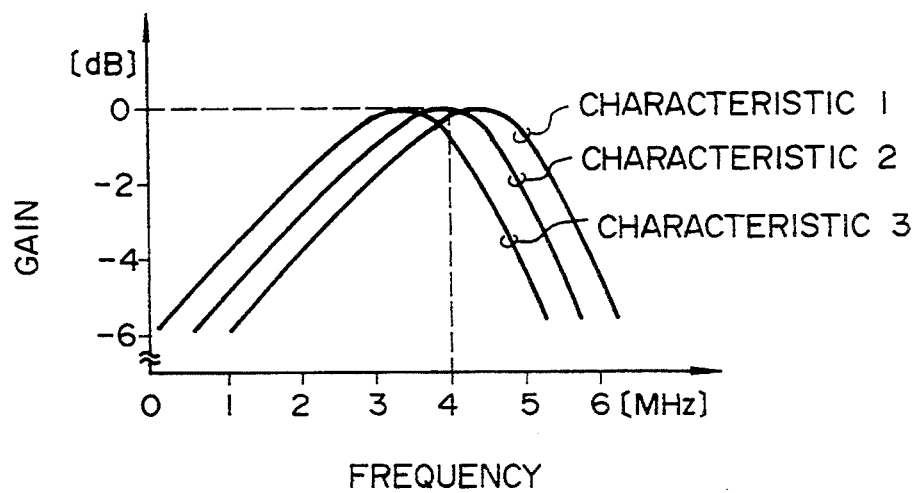
FIG. 7 is a diagram for explaining an example of the characteristics of an FM peaking circuit in FIG. 1.
Figure 8:
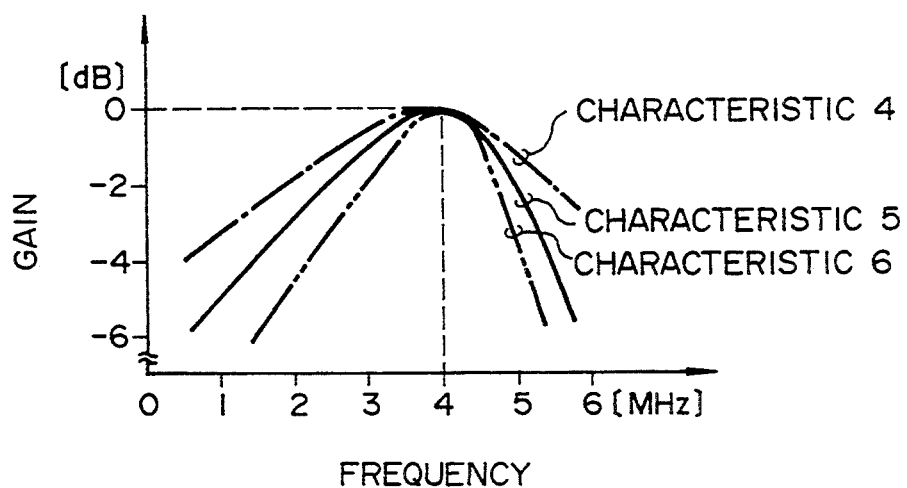
FIG. 8 is a diagram for explaining another example of the characteristics of the FM peaking circuit in FIG. 1.

FIGS. 7 and 8 are diagrams showing an example of the characteristics of the FM peaking circuit 4. The characteristic 2 in FIG. 7 and the characteristic 5 in FIG. 8 provide the same standard characteristic. The characteristics of the FM peaking circuit 4 are switched by the outputs of the APL detector 14 and the noise detector 15 as described above. An example of the characteristics switching by the output of the APL detector 14 is shown in FIG. 7. The peaking frequency is shifted upward as shown by the characteristic 1 when the APL is high with a high carrier frequency of the FM signal, and downward as shown by the characteristic 3 when the APL is low with a low carrier frequency of the FM signal, thus controlling the peak point of the characteristics in such a manner as to always coincide with the carrier frequency. The FM demodulator 9 demodulates a frequency component always having the largest amplitude as a carrier frequency, and thus prevents the tearing noise of a demodulation signal and improves the S/N by the control operation as shown in FIG. 7.

An example of the characteristics switching by the output of the noise detector 15 is shown in FIG. 8. When S/N is high, a peaking characteristic with a low Q like the) characteristic 4 is used to lift up the sideband wave level to thereby to enhance the image contour information. If S/N is low, by contrast, the pass band is narrowed by using the peaking characteristic with a high Q like the characteristic 6 to reduce the noise. In this way, the characteristics of the FM peaking circuit 4 are switched in addition to the automatic picture quality control by the control of the picture quality control circuit 11, thereby realizing an even more effective automatic picture quality control function. The FM peaking circuit 4 is well known.

Now, explanation will be made about a specific circuit including the DC potential circuit 17 and the switch 18 as the essential parts of the present invention with reference to FIG. 9.

Figure 9:
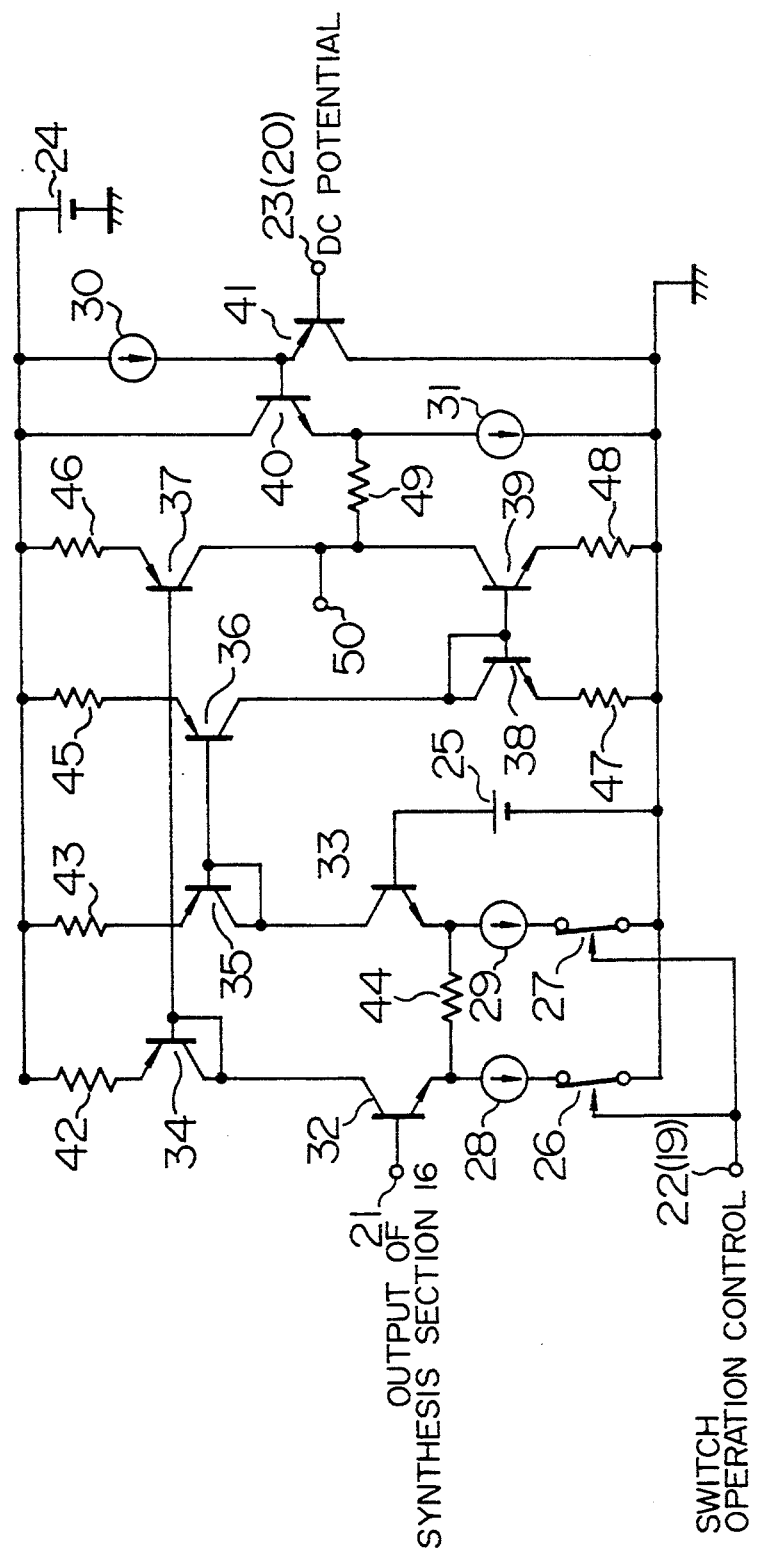
FIG. 9 is a diagram showing a specific example of the DC potential shift circuit and a switch circuit in FIG. 1.

In FIG. 9, a differential amplifier circuit including transistors 32, 33, a resistor 44, and constant-current sources 28, 29 has a negative-phase input terminal impressed with a fixed bias voltage 25 and a positive-phase input terminal 21 supplied with an output voltage of the synthesis section 16. A terminal 22 is supplied with a switch operation control voltage applied to the terminal 19 in FIG. 1A, thereby turning on and off the switches 26, 27. When the switches 26, 27 are on, the collector current of the transistor 32 flows into an end of a load resistor 49 by a current Miller circuit including transistors 34, 37 and resistors 42, 46. The collector current of the transistor 33, on the other hand, is taken out from an end of the load resistor 49 by a current Miller circuit including transistors 35, 36 and resistors 43, 45 and another current Miller circuit including transistors 38, 39 and resistors 47, 48. A bias circuit including transistors 40, 41 and constant-current sources 30, 31 transmits a voltage substantially equal to the voltage applied to the terminal 23 to be applied to the emitter of the transistor 40, and the voltage is applied to the other end of the resistor 49 with low output impedance. The terminal 23 is supplied with a DC potential applied from the terminal 20. To the extent that the differential amplifier circuit and the current Miller circuit are configured in appropriate equilibrium, the current flowing into the load resistor 49 becomes equal in amount to the one taken out thereof when the potential at the terminal 21 is equal to that of the fixed bias voltage 25. The potential at the output terminal 50 thus becomes substantially equal to the voltage applied to the terminal 23. Also when the potential at the terminal 21 undergoes a change, the output potential changes as compared with the voltage applied to the terminal 23. By changing the voltage applied to the terminal 23, therefore, the above-mentioned function of the DC potential shift circuit 17 is realized. When the switches 26, 27 are in the off state, the current ceases to flow into or out of an end of the resistor 49 regardless of the potential at the terminal 21. Therefore, the potential at the output terminal 50 becomes substantially equal to the voltage applied to the terminal 23. As a result, the function of the switch circuit 18 is realized by the on/off operation of the switches 26, 27. As described above, the circuit configuration of FIG. 9 realizes the DC potential shift circuit 17 and the switch circuit 18 in simplified manner.

Figure 10:
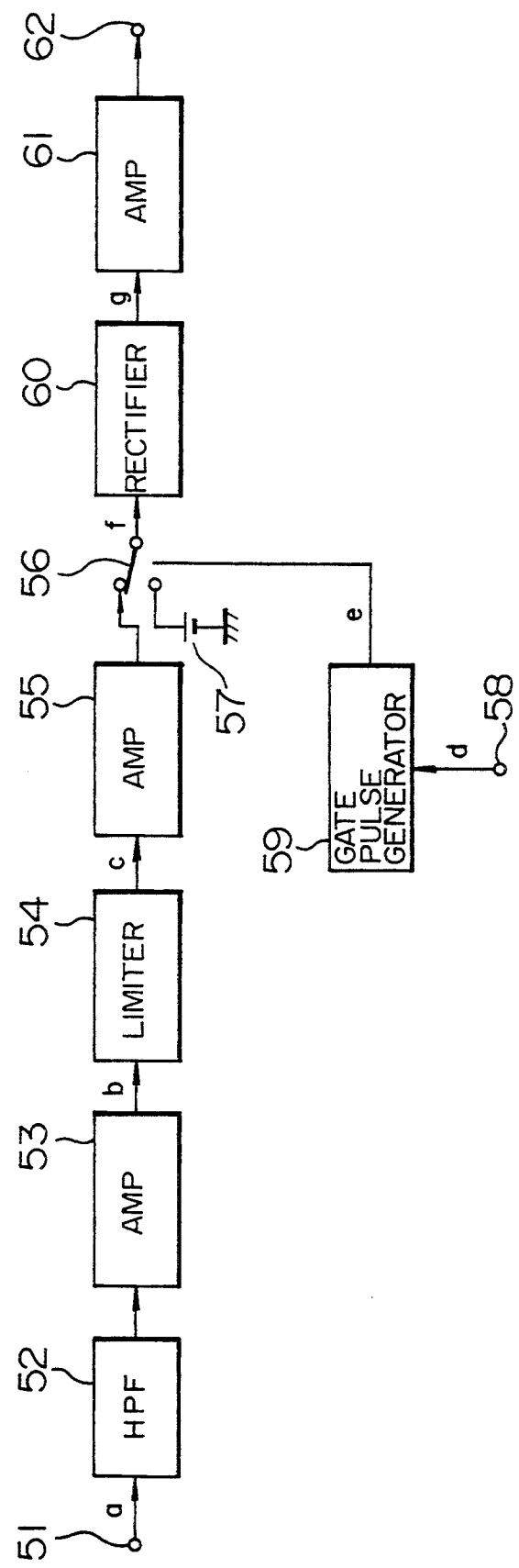
FIG. 10 is a block diagram showing a specific example of a noise detector in FIG. 1.
Figure 11:
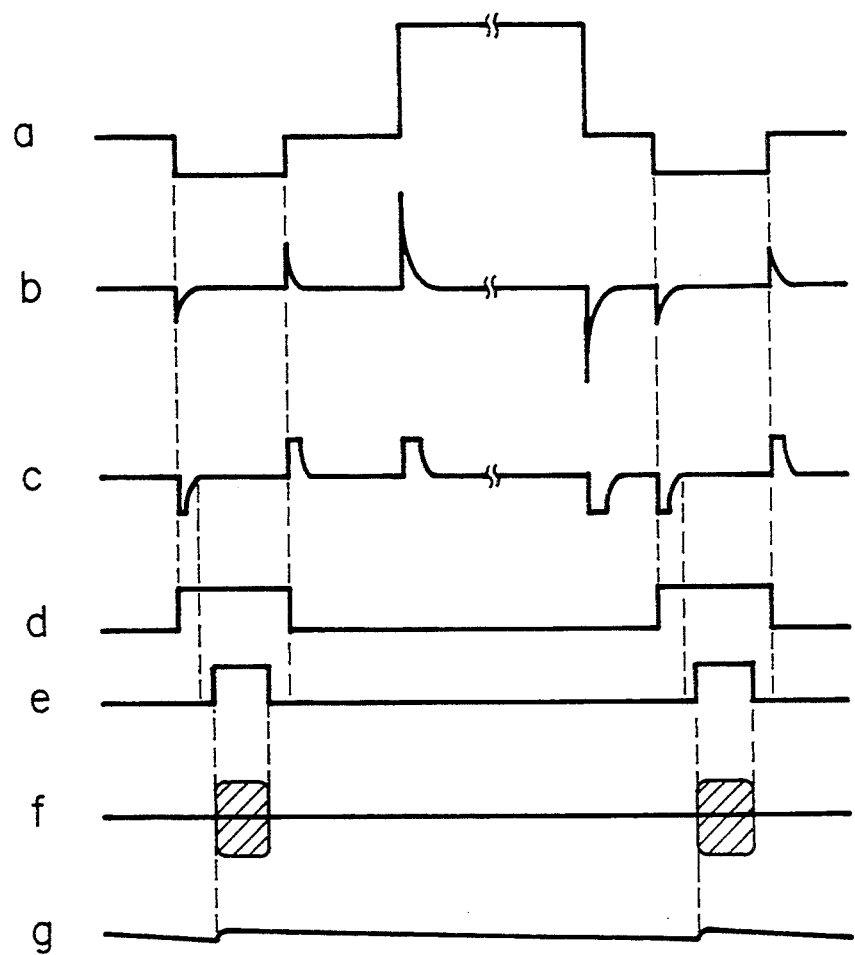
FIG. 11 is a diagram for explaining an example of waveforms produced at various parts of the noise detector shown in FIG. 10.

FIG. 10 is a block diagram showing an example of the configuration of the noise detector 15, and FIG. 11 a diagram showing an example of waveforms produced at various parts of the noise detector 15. An example of the luminance video signal outputted from the LPF 10 is shown as a waveform a. The waveform a, which is input from a terminal 51, has the low-frequency component thereof removed at an HPF 52 and is amplified at an amplifier 53 into a waveform b. The amplitude of the waveform b is further limited in vertical symmetry at a limiter circuit 54, thereby forming a waveform c. The limiter circuit 54 is preferably set to a limiting level slightly higher than the maximum amplitude of the noise component to be detected. The input signal to an amplifier 55 is amplitude-limited by the limiter circuit 54. Even if the gain is set high to permit detection of a minor noise, therefore, a dynamic range cannot be exceeded,. The output of the amplifier 55 is applied to an input terminal of a switch circuit 56, and is produced as an output from the switch circuit 56 when the output e of a gate pulse generation circuit 59 is at a high level. The other input terminal of the switch circuit 56 is impressed with a fixed voltage set by a bias 57, which fixed voltage is output from the switch circuit 56 when the output e of the gate pulse generation circuit 59 is at a low level. The set voltage of the bias capacitor 57 is preferably below the potential at the operating point of the output of the amplifier 55. This is by reason of the fact that if the set voltage is higher than the potential at the operating point, a noise component is positioned at a level lower than the set voltage and could not be sufficiently detected in spite of a successful detection of waveform f. The gate pulse generation circuit 59 is supplied with a sync pulse designated as a waveform d through a terminal 58. The waveform d is an output separated from a horizontal sync signal of waveform a, and is output normally from a signal processing IC in a home-use VTR. On the basis of this waveform d, the gate pulse generation circuit 59 generates a waveform e within the framework of the horizontal sync period, whereby the switching operation of the switch circuit 56 is controlled. The erroneous operation of noise detection due to an overshoot is prevented by setting the rise timing of the waveform e after convergence of the overshoot of the waveform c in synchronism with the trailing edge of the horizontal sync period and at the same time by setting the fall timing of the waveform e before initiation of the overshoot of the waveform c in synchronism with the trailing edge of the horizontal sync period. The waveform f is an output of the switch circuit 56, and the hatched portion represents a noise component that has passed through the switch circuit 56 during the period of a high-level gate pulse. This noise component is rectified by a rectifier 60 as a waveform g. The waveform g increases in potential with the decrease in S/N. This detected potential is converted at an amplifier 61 so that the characteristic shown in FIG. 3 is output from a terminal 62.

For assuring a stable noise-detecting operation, the characteristic of the limiter circuit 54 used in the present embodiment is desirable such that the gain remains unchanged against a noise component not affected by the limiter. A change in gain is accompanied by a change in the characteristics shown in FIG. 3 and therefore is not desirable. The amplitude limitation of a signal component, on the other hand, is preferably symmetrical vertically. If the amplitude limitation is not symmetrical vertically, an AC coupling of blocks in subsequent stages would cause a change of the central potential level of the waveform f, resulting in an undesirable change in the characteristics of FIG. 3.

Figure 12:
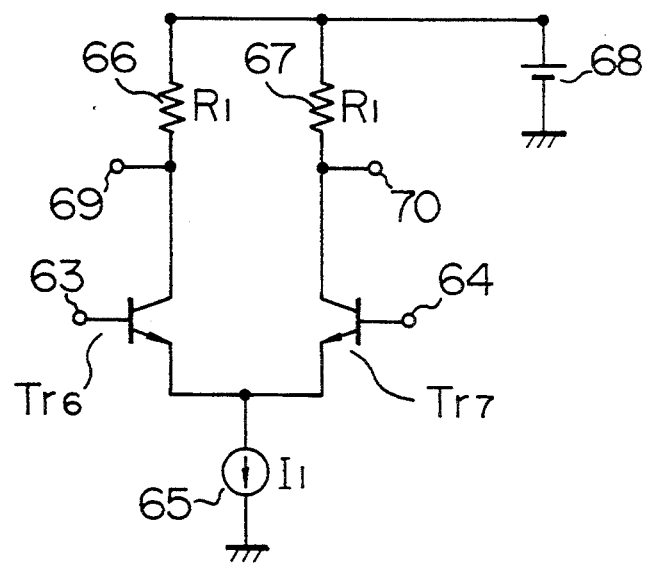
FIG. 12 is a diagram for explaining the configuration of a conventional limiter circuit.

A specific example of a conventional limiter circuit is shown in FIG. 12 for reference. As seen from FIG. 12, this limiter circuit includes a differential amplifier with a positive-phase input terminal 63, a negative-phase input terminal, 64 a positive-phase output terminal 70 and a negative-phase output terminal 69. This differential amplifier produces an output proportional to the difference between the input signals to the two input terminals 63 and 64. In the case where there is only one input as in the present invention, the circuit is configured in such a manner that one of them is used as an input terminal while the other terminal has the voltage thereof substantially fixed.

In FIG. 12, the current $I_1$ of a constant-current circuit 65 flows through a load resistor 67 in its entirety when a transistor Tr6 is turned off. The voltage at the terminal 70 is therefore given as ($Vcc - R_1 I_1$), where Vcc is the voltage across a power supply 68. At this time, the voltage at the terminal 69 is Vcc, so that the maximum signal amplitude $V_1$ between the terminals 69 and 70 is $R_1 I_1$. Thus the effect of amplitude limitation is obtained whereby the amplitude of this differential amplifier is limited to the voltage $R_1 I_1$.

Now, let us consider the gain $Gv_1$ for a minor signal not affecting the limiter effect. The emitter differential resistance of a transistor Te7 is expressed as $$\gamma_{e7} = \frac{kT}{qI_{E7}}$$

where
q: unit charge amount,
k: Boltzmman's constant,
T: absolute temperature,
$I_{E7}$: emitter current.
The emitter current $I_{E7}$ is given as $I_1/2$ as an average, $$\gamma_{e7} = \frac{2kT}{qI_1}$$

In similar fashion, the differential resistance $Y_{e6}$ of the transistor Tr6 is expressed as $$\gamma_{e6} = \frac{2kT}{qI_1}$$

Thus the gain $Gv_1$ of the minor current is $$Gv_1 = \frac{R_1}{\gamma_{e6} + \gamma_{e7}} = \frac{qI_1R_1}{4kT} \qquad (1)$$

As will be seen from equation (1), the gain $Gv_1$ is inversely proportional to the absolute temperature T. This temperature dependency, which causes a considerable gain change of 20% with a temperature change of 50° K. against the normal temperature of 273° K., poses a great practical problem.

Figure 13:
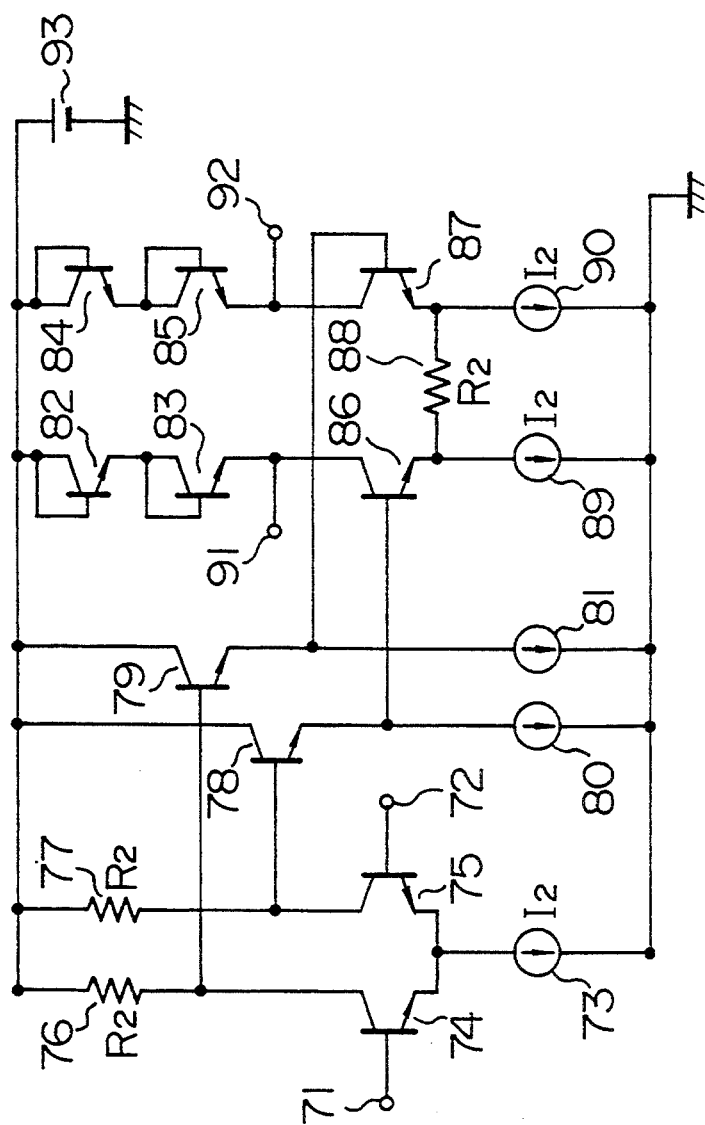
FIG. 13 is a diagram showing a specific example of a delimiter circuit according to the present invention.

FIG. 13 is a circuit diagram showing a specific example of a limiter circuit according to the present invention. As will be seen from FIG. 13, the limiter circuit includes two stages of differential amplifiers having a positive-phase input terminal 71, a negative-phase input terminal 72, a positive-phase output terminal 92 and a negative-phase output terminal 91. The differential amplifier circuit in the first stage makes up the same circuit as the conventional circuit shown in FIG. 12, and has the positive-phase output thereof produced from the emitter of the transistor 78 and the negative-phase output from the emitter of the transistor 79. The maximum signal amplitude $V_2$ of the output in the first stage is limited by $V_2 = R_2 \times I_2$, thus producing the amplitude limiting effect, where $R_2$ is the values of the load resistors 76, 77 and $I_2$ the current of the constant-current source 73. The gain $Gv_2$ for a minor signal not affecting the limiter in the output of the first stage can be introduced as equation (2) in the same manner as equation (1).

$$Gv_2 = (qI_2R_2)/(4kT) \qquad (2)$$

As will be apparent from equation (2) above, the gain $Gv_2$ is inversely proportional to the absolute temperature T. Also, when the value of the resistor 88 is assumed to be $R_2$ and the current value of the constant-current sources 89, 90 is assumed to be $I_2$, the minor signal gain $Gv_3$ of the differential amplifier circuit in the last stage is expressed by equation (3) below.

$$Gv_3 \approx (2kT)/(qI_2R_2) \qquad (3)$$

where $R_2 >> \{(2kT)/(qI_2)\}$.

Thus the overall gain of the circuit shown in FIG. 13 is expressed as shown in equation (4) below.

$$Gv_4 = 2Gv_2Gv_3 \approx 1 \qquad (4)$$

As will be understood from this equation (4), the gain $Gv_4$ represents a superior characteristic not affected by the temperature dependency or the variations of constants of the elements, if the ratio among values of elements in each group of the resistors 76, 77, 88, the constant current sources 73, 89, 90 and the transistors 74, 75, 82, 83, 84, 85 is accurate. This circuit is thus preferably used as the above-mentioned limiter circuit 54, and also provides a circuit suitable for circuit integration since the accurate ratio among values of elements realizes a superior characteristic. Further, the output potential $V_{91}$ at the terminal 91 and the output potential $V_{92}$ at the terminal 92 are desirably used as a differential output $V_{92} - V_{91}$. Otherwise, the use of single outputs would lead to the disadvantage that since the load of the differential amplifier circuit in the last stage is configured of differential resistors of the transistors 82, 83, 84, 85, a large signal amplitude is likely to cause a distortion due to the non-linearity of the load. The waveform distortions in $V_{92}$ and $V_{91}$, however, are in the same phase, and therefore the use of the differential amplifier $V_{92} - V_{91}$ as mentioned above considerably reduces the disadvantage, thus permitting the use as a limiter circuit without any adverse effect.

Figure 14:
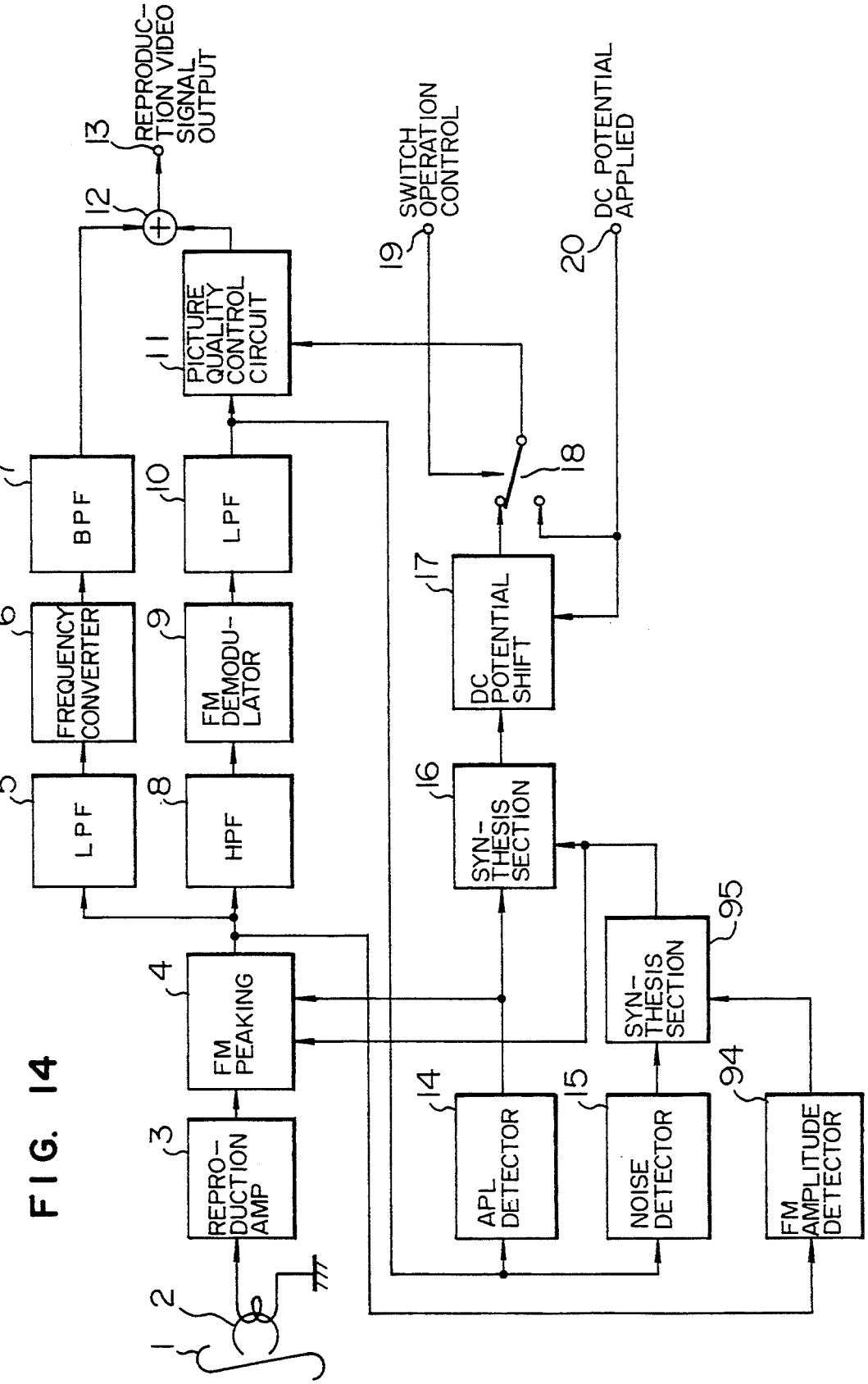
FIG. 14 is a block diagram showing another example of a system embodying the present invention applied to the reproduction system of a home-use VTR.
Figure 15:
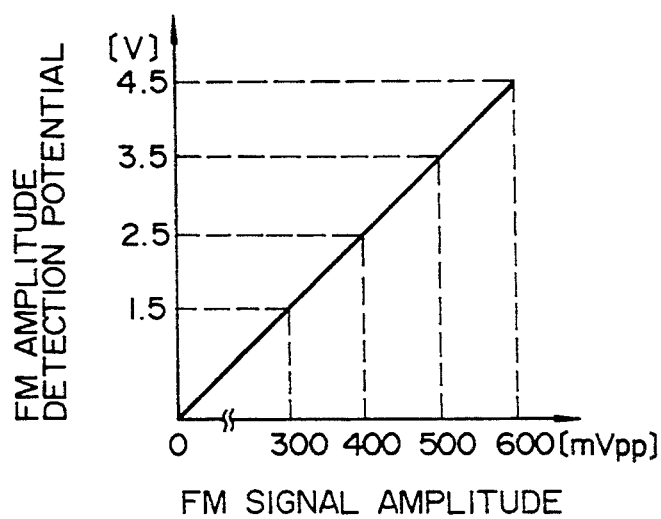
FIG. 15 is a diagram for explaining an example of the characteristics of an FM amplitude detector in FIG. 14.
Figure 16:
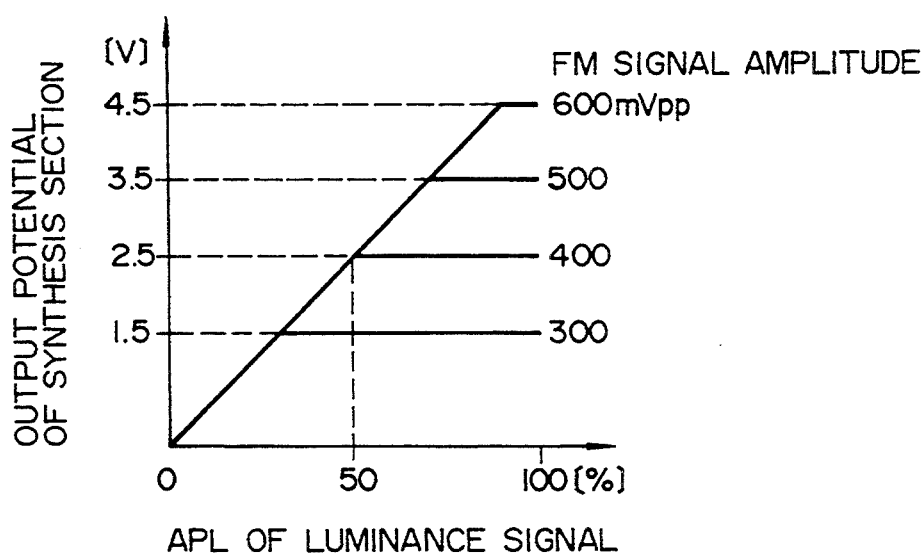
FIG. 16 is a diagram for explaining an example of the characteristics of a synthesis section 16 in FIG. 14.

FIG. 14 is a block diagram showing another embodiment of a reproduction system for a home-use VTR to which the present invention is applied apart from the system of FIG. 1. This embodiment is different from that of FIG. 1 only in that the circuit of FIG. 14 further includes an FM amplitude detector 94 and a synthesis section 95. The explanation below therefore will be limited to this difference. An example of characteristics of the FM amplitude detector 94 is shown in FIG. 15. The synthesis section 95 using a circuit similar to the one included in FIG. 1B compares the output potential of the noise detector 15 with that of the FM amplitude detector 94 and produces the lower of the two. In the case where the reproduction FM amplitude is small, a picture deterioration is caused very often due to the demagnetization or tracking failure of the magnetic tape. Also, generally speaking, the smaller the FM signal amplitude, the lower the S/N. In view, of this, the picture quality may be controlled by detecting the information on the FM signal amplitude instead of the noise detector 15. In this way, the dual use of the FM signal amplitude information and the information detected by the noise detector 15 is expected to produce an effective function as a protection circuit against any malfunction of the noise detector 15. FIG. 16 shows an example of the characteristics of the synthesis section 16 based on the assumption that the noise detector 15 malfunctions and produces a high potential (4.5 V or higher). In this case, as shown, the FM signal amplitude information, which is produced from the synthesis section 95, clips the upper limit of the output potential. As a result, the smaller the FM amplitude, the lower the clip potential. The malfunction due to the noise detector 15 is thus avoided.

Figure 17:
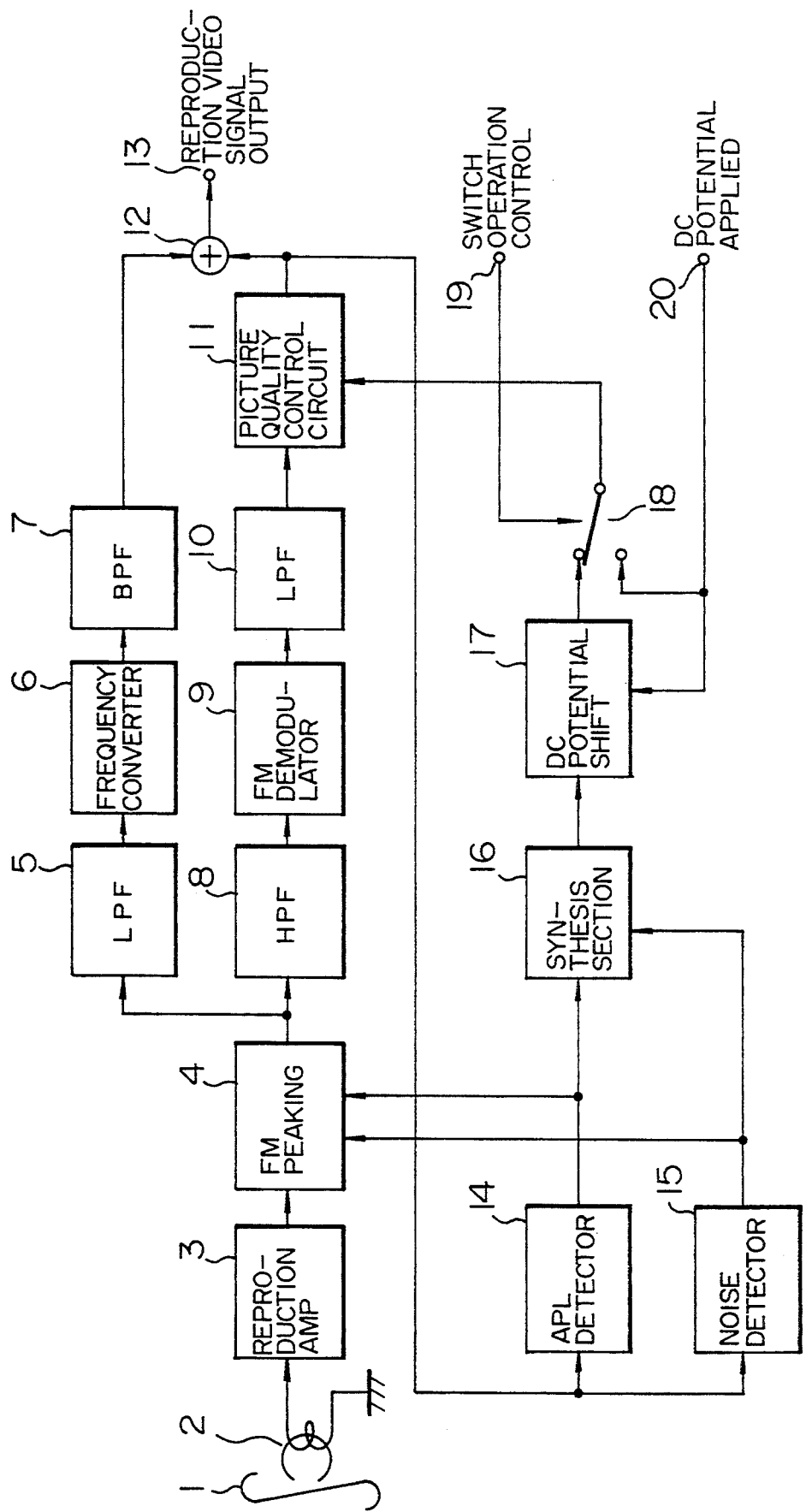
FIG. 17 is a block diagram showing still another example of a system embodying the present invention applied to the reproduction system of a home-use VTR.

FIG. 17 is a block diagram showing still another example of a reproduction system of a home-use VTR to which the present is applied apart from FIGS. 1 and 14. The only difference of this embodiment from that of FIG. 1 lies in that in the embodiment under consideration, the signals applied to the APL detector 14 and the noise detector 15 are extracted from the output not of the LPF 10 but of the picture quality control circuit 11. Explanation that follows therefore will be confined to this difference. In the case where the output signal of the picture quality control circuit 11 has a low S/N, the noise is suppressed by reducing the control voltage of the picture quality control circuit 11 by the automatic picture quality control function as described above. Consequently, the S/N of the output signal of the picture quality control circuit 11 is improved. This series of operations performs the function of negative feedback to attain a predetermined S/N value of the output signal of the picture quality control circuit 11. In other words, the system works for maintaining the S/N of the reproduced picture at a constant level.

As will be understood from the foregoing description, according to the present invention, a video signal processing apparatus for automatically controlling the picture quality in proper manner is realized with ease and high performance on the basis of the picture information represented by the S/N and screen brightness, thereby greatly contributing to an increased value of the reproduction system of a home-use VTR, etc.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A video signal processing apparatus comprising:
   reproduction means for reproducing a video signal from a video signal recording medium, and includes an FM (frequency modulation) peaking circuit having a frequency characteristic with a peak in the neighborhood of an FM carrier frequency of an FM signal read from the recording medium having an FM-modulated video signal recorded therein;
   first detection means for detecting an average picture level (APL) in the video signal reproduced by the reproduction means as a first DC potential signal;
   second detection means for detecting a component associated with a noise of said video signal,
   wherein said second detection means includes first noise detection means for detecting a first noise signal associated with the signal-to-noise ratio of the video signal as a second DC potential signal, and second noise detection means for detecting the output amplitude of the FM peaking circuit as a third DC potential signal, and
   synthesis means for producing the smallest one of the second DC potential signal from the first noise detection means, the third DC potential signal from the second noise detection means and the first DC potential signal from said first detection means, as a DC potential control signal;
   means for selecting one of a plurality of reproduction modes of said reproduction means;
   means for producing a DC signal in accordance with the one reproduction mode selected by said selecting means;
   DC potential shift means for shifting the level of the DC potential control signal from said synthesis means in accordance with the DC signal produced by said DC signal producing means; and
   picture quality control means for controlling the picture quality of the video signal reproduced at the reproduction means by a shifted DC potential signal of the DC potential shift means.

2. A video signal processing apparatus comprising:
   reproduction means for reproducing a video signal from a video signal recording medium;
   detection means for detecting as a DC potential signal at least one information affecting image quality contained in the video signal reproduced by said reproduction means;
   means for selecting one of a plurality of reproduction modes of said reproduction means;
   means for producing a DC signal in accordance with the one reproduction mode selected by said selecting means;
   DC potential shift means for shifting the level of the DC potential signal detected by said detection means in accordance with the DC signal produced by said DC signal producing means, including:
     DC potential generation means for generating a variable DC potential which varies in accordance with the reproduction mode of said reproduction means, and
     a DC potential shift circuit for shifting the level of the DC potential signal from said detection means in accordance with the DC signal from said DC signal producing means, wherein said DC potential shift circuit includes:
       voltage-current conversion means for converting a DC potential signal from said detection means into a current signal,
       a load impedance with said current signal flowing into an end thereof from the voltage-current conversion means, and
       means for supplying said variable DC potential from the DC potential generation means to the other end of said load impedance; and picture quality control means for controlling the picture quality of the video signal reproduced at the reproduction means by a shifted DC potential signal of said DC potential shift means.

3. A video signal processing apparatus according to claim 2, wherein said DC potential shift circuit includes switching means capable of setting the current signal of said voltage-current conversion means to zero.

4. A video signal processing apparatus, comprising:
reproduction means for reproducing a video signal from a video signal recording medium;
detection means for detecting as a DC potential signal at least one information affecting image quality contained in the video signal reproduced by said reproduction means;
means for selecting one of a plurality of reproduction modes of said reproduction means;
means for producing a DC signal in accordance with the one reproduction mode selected by said selecting means;
DC potential shift means for shifting the level of the DC potential signal detected by said detection means in accordance with the DC signal produced by said DC signal producing means;
picture quality control means for controlling the picture quality of the video signal reproduced at said reproduction means by a shifted DC potential signal of said DC potential shift means;
DC potential generation means for generating a variable DC potential in response to said DC signal from said DC signal producing means; and
switching means for selecting one of the output signals from said DC potential shift means and the variable DC potential from said DC potential generation means and supplying the selected signal to said picture quality control means.

5. A video signal processing apparatus according to claim 4, wherein said switching means is turned to said DC potential shift means when the reproduction means is in normal reproduction mode and to said DC potential generation means when said reproduction means is in special reproduction mode.

6. A video signal processing apparatus according to claim 5, wherein said special reproduction mode includes at least one of the dubbing mode, still picture mode, slow motion mode and search mode.

7. A video signal processing apparatus according to claim 4, wherein said switching means includes means adapted to be switched by external operation during normal reproduction.

* * * * *